June 30, 1942.  J. J. GREGORY  2,288,521
HOLLOW GLASS BLOCK
Filed Jan. 27, 1940  2 Sheets-Sheet 1

INVENTOR
JOHN J. GREGORY
BY Olew E. Bee
ATTORNEY

June 30, 1942.  J. J. GREGORY  2,288,521
HOLLOW GLASS BLOCK
Filed Jan. 27, 1940  2 Sheets-Sheet 2

INVENTOR
JOHN J. GREGORY
BY Olew E. Bee
ATTORNEY

Patented June 30, 1942

2,288,521

UNITED STATES PATENT OFFICE 2,288,521

HOLLOW GLASS BLOCK

John J. Gregory, New Kensington, Pa., assignor to Pittsburgh Corning Corporation, Allegheny County, Pa., a corporation of Pennsylvania Application January 27, 1940, Serial No. 315,956

7 Claims. (Cl. 72—41)

The present application relates to building blocks and notably to hollow blocks formed of glass or similar transparent material.

One object of the invention is to provide a hollow transparent or translucent building block having means fabricated therein and operable exteriorly of the blocks for controlling the amount of radiant heat and light passing through the blocks.

A second object of the invention is to provide a simple and effective structure interconnecting the light-controlling means in a series of hollow glass blocks in a wall for simultaneous operation.

These and other objects of the invention will be apparent from consideration of the following specification and the appended claims.

One objection to conventional glass blocks for building walls is that a block sufficiently transparent to transmit an adequate amount of light on dull days or when the sun is in certain positions, will on bright days, or when the sun is in other positions, transmit too much light or will transmit too much sky light, thus producing an objectional glare for occupants of the building in which the blocks are employed. Also, when the sun is brilliant an excessive amount of heat is transmitted to the interior. Likewise, in cold weather an excessive amount of heat is lost by radiation through the glass.

In accordance with the provisions of the present invention it is proposed to obviate these objectional features by introduction of a system of adjustable louver bars directly into the interior of the hollow blocks, the louvers being provided with means whereby the position thereof can be regulated at the will of the occupants of the building.

For a better understanding of the invention reference may now be had to the accompanying drawings in which like numerals refer to like parts throughout.

In the drawings

Figure 2:
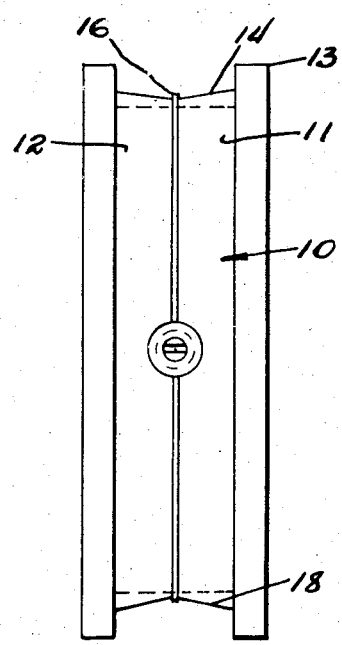
Figure 2 is a side elevational view of the block shown in Figure 1.

In the form of the invention shown in the drawings a glass block 10 is formed of two tray-like halves 11 and 12, which include marginal shoulders 13 and edge walls 14. As shown in Figure 2 the edges of the walls are joined together along the line 16, in order to form the block. The union of the edges may be effected in any convenient manner, for example, by fusing them together to provide a glass weld, or by application of solder to the glass, preferably when the latter is in heated state. They may also be held together by strips of plastic or by means of cements adherent to the glass or by any other appropriate means. It will be observed that in the completed block shoulders 13 provide a peripheral groove or channel 18 about the margins of the block, designed to receive mortar, cement or other bonding agency between contiguous blocks.

Figure 1:
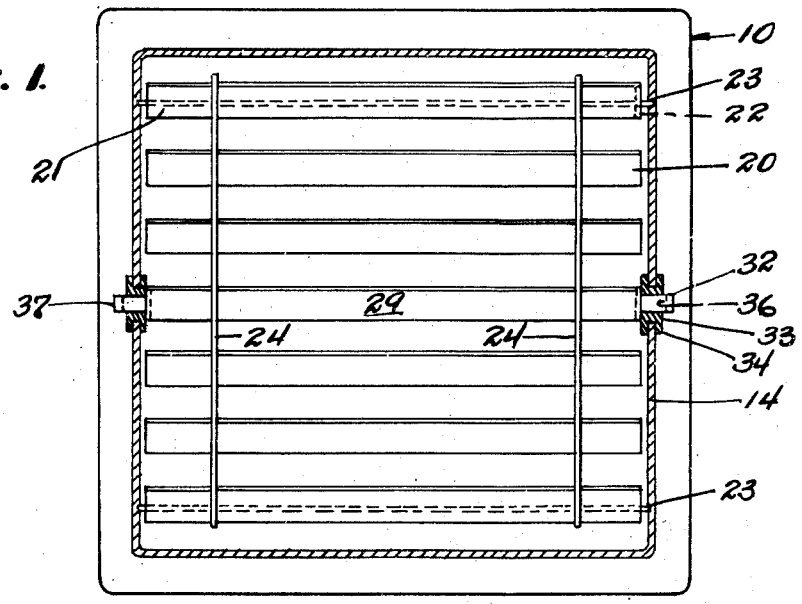
Figure 1 is a cross-sectional view of a glass block showing the construction of the louvers disposed therein.
Figure 3:
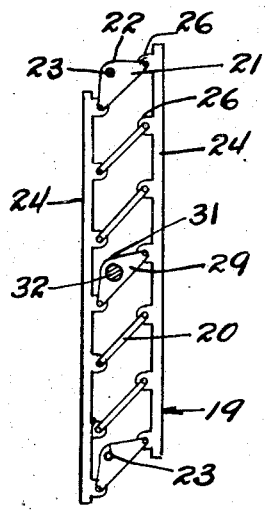
Figure 3 is a side elevational view of a louver construction suitable for use in practicing the invention.

Louvers 19 for use in the block as best shown in Figures 1 and 3 embody a system of spaced, horizontal bars 20, the end bars 21 of which are provided at their extremities with angularly disposed lugs 22 through which extend pivotal means for the bars. The latter may comprise rods 23 journaled in the lugs 22 and having their ends embedded in the medium, which provides a union between the contiguous edges of side walls 14 of the block. The bars are all interconnected for simultaneous rotation by vertical rods or links 24 having ears or tabs 26 formed with openings 27 that are interlinked with the openings (not shown) in the bars.

For purposes of admitting of adjustment of the louver bars, the mid bar 29 is provided at its extremities with angularly disposed lugs 31 having axially extending studs 32 designed to rotate in grommets or glands 33 of brass, lead, fiber or other material. The latter are disposed in openings of suitable size in the walls of the block and are provided with peripherally-extending flanges 34, designed to engage upon opposite sides of the side walls to provide a seal.

Figure 4:
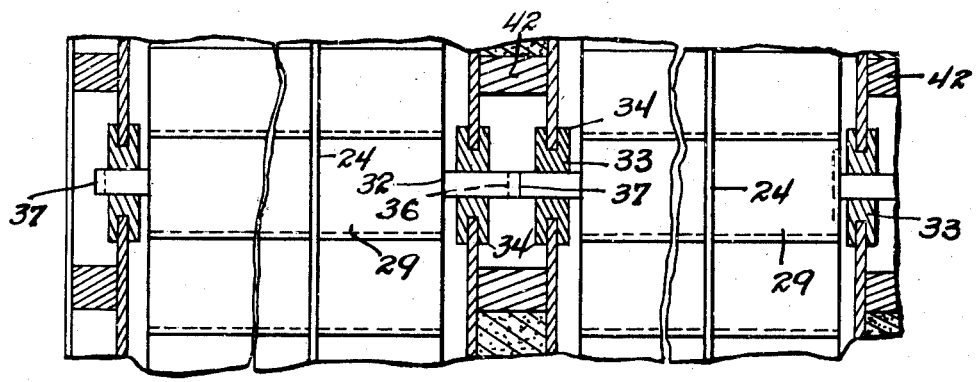
Figure 4 is a fragmentary cross-sectional view through two contiguous glass blocks showing the manner in which the louver constructions are interconnected for simultaneous operation.

For purposes of interconnecting the louvers of different blocks for simultaneous rotation studs 32 are alternately provided with slots 36 and tongues 37 designed to register and provide an operable connection best shown in Figure 4.

The rods 23 function to prevent the louver system from rocking about studs or shafts 32 as a unit.

In a wall constructed of the blocks, the blocks are set in edge to edge relation as shown in Figure 4 and the channels 18 about the margins of the blocks are filled with a mortar or cement 41, which provides a bond between the adjacent blocks. In order to prevent the mortar from engaging with and interfering with the operation of the studs 32, sealing rings or washers 42 may be disposed between contiguous blocks in such manner as to provide a seal, excluding the mortar about the studs. These washers may be formed of rubber, fiber, plastic materials, such as wax, asphalt or artificial resins, or any other material of sufficient strength to provide a dam to hold back the mortar while it is hardening. It will be apparent that these rings in addition to excluding the mortar about the studs 32 may also function as sealing agents to prevent the entrance of air and moisture through the openings for the studs in the packings or glands 33. If desired, the material of the rings may be directly bonded to or adhered to the contiguous surfaces of the glass.

Figure 5:
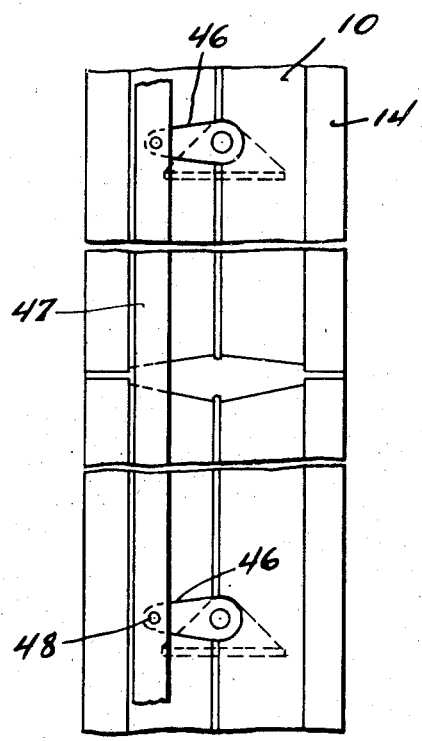
Figure 5 is a fragmentary end elevational view showing one convenient method by means of which the louvers in a plurality of rows of blocks may be interconnected.

In some instances it may be desirable to join together the louvers in the blocks of a plurality of rows for simultaneous movement. Construction suitable for this purpose is shown in Figure 5 in which are shown fragments of the end blocks of two contiguous rows. The studs 32 in these blocks are provided with levers 46 which are keyed to the studs or otherwise rigidly connected in such manner that rotation of the levers will also cause corresponding rotation of the studs in order to actuate the adjustable louvers. Levers 46 are pivoted to and interconnected by a vertical link 47, for simultaneous rotation. One of the studs 32 may be rotated in any convenient manner, for example, by means of a suitable key (not shown), thus causing the lever 47 to be raised or lowered and thus correspondingly operating the louvers in all of the rows of blocks.

The louver bars 20, 21 and 29 may be formed of any suitable material, e. g., aluminum, steel or the like. They may be provided with polish surfaces in order to assure maximum reflection of light and heat either outwardly or inwardly through the blocks. In some instances it may be desirable to provide one surface of each member with a bright or light colored coating and the other surface with a black or dark coating. By rotating such bars it is possible to face either surface outwardly or inwardly as may be desired. Assuming that the bright or light surface is faced outwardly when the sun is hot, it will be apparent that much of the light and heat will be reflected outwardly, thus maintaining the temperature of the interior of the building at a minimum. On the other hand, if it is desired in cold weather to maintain the temperature in the interior of the building within the building above that outside the position of the bars may be reversed, thus reflecting maximum amount of heat into the interior of the building and absorbing as much as possible of the light and radiant heat entering from the exterior of the building. The absorbed heat will tend to warm the interiors of the blocks and thus maintains the inner surface of the latter at a higher temperature than would otherwise be obtained. At the same time external glare will be reduced or eliminated. Under some conditions, it may be desirable to reflect the light upwardly against the ceiling or to certain parts of the room. This can be accomplished by proper adjustment of the angle of the louver bars.

The form of the invention herein shown and described may be considered as being merely alternative. It will be apparent that numerous modifications may be made therein without departure from the spirit of the invention or the scope of the appended claims.

What I claim is:

1. A hollow glass building block having opposed faces, perimetric side walls integral with the faces and with the faces providing a closed chamber, a louver system in the chamber and comprising spaced parallel louver bars, one of said bars being secured to a rotatable shaft projecting longitudinally thereof through an opening in one of said side walls, the remainder of the bars being free to rotate about their individual longitudinal axis, means interconnecting the bars for simultaneous rotation upon rotation of the shaft and means to prevent the system from rocking about the shaft as an axis.

2. A construction as defined in claim 1 in which said element constituting the shaft is provided with means adapted operably to engage a mating shaft from a similar louver system in a contiguous block whereby operation of the louvers in one block correspondingly operates those in the contiguous block.

3. A building construction comprising hollow glass blocks, having shoulders providing peripheral channels for mortar, laid in edge to edge relation to provide a wall, the channels between the blocks being filled with mortar, a screen in each block operable to control the illumination passing through the block and means passing through the walls of the blocks and into the mortar in the channels and interconnecting screens in contiguous blocks for simultaneous operation.

4. A building construction comprising a plurality of hollow blocks of glass laid to form a wall, a screen in each block, said screen comprising louver bars, means to support the bars of each screen for rotation in a block each about its individual longitudinal axis, to control radiation passing through the block, means interconnecting the louvers in each screen for simultaneous operation and means passing through a wall of each of the blocks and inter-connecting a louver of one screen with a corresponding louver of the screen in a contiguous block, whereby operation of the screen in the first block correspondingly operates the screen in the contiguous block.

5. A glass building block comprising two superposed tray-like sections having their edges secured together to provide a chamber, said block having a screen disposed therein, means to support the screen, said screen comprising at least one part movable to vary the amount of light passing through the block and means passing through a wall of the block at the line of contact between the two sections and being connected to the screen for controlling the adjustment of the latter.

6. A construction as defined in claim 5 in which the screen comprises a series of louver bars, said means supporting the bars in the block permitting rotation about a longitudinal axis, means interconnecting the bars, whereby rotation of one correspondingly rotates the other, a shaft secured to one of the bars, the shaft being coaxial with the axis of rotation of said bar and projecting through a side wall of said block at the line o fcontact between the sections for rotating the screen to adjust the amount of light passing through the block.

7. A building construction comprising a plurality of hollow glass blocks laid in edge to edge relation to provide a wall, a screen disposed in each block, means in each block to support the screen therein, each screen being adapted to intercept light passing through the block in which it is disposed, but at least a part of it being movable to vary the amount of light intercepted, means in each block operable to move said screen and passing through a wall of the block in which it is disposed and being interconnected with the corresponding means operable to move the screen in a contiguous block, whereby operation of the screen in one block correspondingly operates the screen in the other.

JOHN J. GREGORY.